United States Patent
Kurup

(10) Patent No.: US 11,834,565 B2
(45) Date of Patent: Dec. 5, 2023

(54) SHAPE MEMORY PRODUCTS AND METHOD FOR MAKING THEM

(71) Applicant: Tyco Electronics UK Ltd., Wiltshire (GB)

(72) Inventor: Sreeni Kurup, Wiltshire (GB)

(73) Assignee: Tyco Electronics UK Ltd., Swindown (GB)

( * ) Notice: Subject to any disclaimer, the term of this patent is extended or adjusted under 35 U.S.C. 154(b) by 129 days.

(21) Appl. No.: 17/494,393

(22) Filed: Oct. 5, 2021

(65) Prior Publication Data

US 2022/0025148 A1 Jan. 27, 2022

Related U.S. Application Data

(60) Division of application No. 15/272,604, filed on Sep. 22, 2016, now abandoned, which is a continuation of application No. PCT/GB2014/050916, filed on Mar. 24, 2014.

(51) Int. Cl.

| | |
|---|---|
| *C08J 9/32* | (2006.01) |
| *B29C 35/08* | (2006.01) |
| *C08J 9/00* | (2006.01) |
| *B29C 44/42* | (2006.01) |
| *B29C 44/34* | (2006.01) |
| *B29K 105/04* | (2006.01) |
| *B29K 105/00* | (2006.01) |
| *B29K 223/00* | (2006.01) |
| *B29K 23/00* | (2006.01) |
| *B29K 105/24* | (2006.01) |

(52) U.S. Cl.
CPC ............ *C08J 9/32* (2013.01); *B29C 35/0805* (2013.01); *B29C 44/3415* (2013.01); *B29C 44/42* (2013.01); *C08J 9/0023* (2013.01); *C08J 9/0061* (2013.01); *C08J 9/0095* (2013.01); *B29C 2035/0877* (2013.01); *B29K 2023/0641* (2013.01); *B29K 2023/083* (2013.01); *B29K 2105/0026* (2013.01); *B29K 2105/0076* (2013.01); *B29K 2105/048* (2013.01); *B29K 2105/24* (2013.01); *B29K 2223/083* (2013.01); *B29K 2995/0002* (2013.01); *B29K 2995/0015* (2013.01); *B29K 2995/0077* (2013.01); *C08J 2201/026* (2013.01); *C08J 2203/22* (2013.01); *C08J 2323/06* (2013.01); *C08J 2423/08* (2013.01)

(58) Field of Classification Search
CPC . C08J 9/32; C08J 9/0023; C08J 9/0061; C08J 9/0095; C08J 2201/026; C08J 2203/22; C08J 2323/06; C08J 2423/08; B29C 35/0805; B29C 44/3415; B29C 44/42; B29C 2035/0877; B29K 2023/0641; B29K 2023/083; B29K 2105/0026; B29K 2105/0076; B29K 2105/048; B29K 2105/24; B29K 2223/083; B29K 2995/0002; B29K 2995/0015; B29K 2995/0077

See application file for complete search history.

(56) References Cited

U.S. PATENT DOCUMENTS

| | | | |
|---|---|---|---|
| 3,615,972 A | 10/1971 | Morehouse, Jr. et al. | |
| 3,776,989 A * | 12/1973 | Annis, Jr. ............. | B29C 44/421 264/DIG. 83 |
| 3,878,285 A * | 4/1975 | Souffie .................... | B29C 45/50 264/328.2 |
| 4,048,275 A * | 9/1977 | Usamoto ................. | B29C 44/42 264/DIG. 83 |
| 4,123,586 A | 10/1978 | Betts et al. | |
| 5,260,381 A | 11/1993 | Needham | |
| 5,405,665 A | 4/1995 | Shukushima et al. | |
| 5,733,480 A | 3/1998 | Lee et al. | |
| 5,889,117 A | 3/1999 | Flenniken | |
| 6,475,633 B1 | 11/2002 | Robert et al. | |
| 2003/0034723 A1 | 2/2003 | Mehan et al. | |
| 2005/0027025 A1 | 2/2005 | Erb et al. | |
| 2005/0031811 A1 | 2/2005 | Mehan et al. | |

FOREIGN PATENT DOCUMENTS

| | | | |
|---|---|---|---|
| EP | 1967345 A1 | 9/2008 | |
| WO | 03014203 A1 | 2/2003 | |

OTHER PUBLICATIONS

PCT Notification of Transmittal of The International Search Report and The Written Opinion of the International Searching Authority, International Application No. PCT/GB2014/050916, dated Dec. 3, 2014, 8 pages.
Expancel Microspheres, Nouryon article flame retardant, 2018, https://expancel.nouryon.com/what-are-expancel-microspheres/.

* cited by examiner

*Primary Examiner* — Irina S Zemel
(74) *Attorney, Agent, or Firm* — Barley Snyder

(57) ABSTRACT

A method for producing a heat-shrinkable product is provided. First, a polymer composition containing a polymer, a crosslinking agent and a micro-encapsulated foaming agent uniformly dispensed therein is melt mixed. The foaming agent has a peak activation temperature which is higher than a temperature of the melt mixing. Next, the polymer composition is injection molded into a molded product. This carried out at the peak activation temperature to activate the foaming agent. Then, the molded product is crosslinked within the mold.

20 Claims, 1 Drawing Sheet

SHAPE MEMORY PRODUCTS AND METHOD FOR MAKING THEM

CROSS-REFERENCE TO RELATED APPLICATION

This application is a divisional of co-pending U.S. patent application Ser. No. 15/272,604, filed Sep. 22, 2016, which is a continuation of PCT International Application No. PCT/GB2014/050916, filed Mar. 24, 2014.

FIELD OF THE INVENTION

The invention relates to a method of forming an insulation material, and more particularly to molded, heat shrinkable products for use, for example, as insulating materials.

BACKGROUND

Lightweight heat shrinkable products are increasingly important in a number of industries, notably the aerospace and automotive industries, where weight reduction is a major consideration. One way of making heat-recoverable products is through a melt composition having a base polymer, such as ethylene vinyl acetate copolymer, and a blowing agent made from at least one heat-activated chemical compound encapsulated by a plurality of polymeric shells. The melt composition may also include a crosslinking promoter or other additives. The blowing agent has an activation temperature and is activated through heat during the manufacturing process. For instance, U.S. Pat. No. 3,615,972A discloses known heat-activated liquid blowing agents encapsulated in expansible thermoplastic microspheres.

SUMMARY

A method for producing a heat-shrinkable product is provided. First, a polymer composition containing a polymer, a crosslinking agent and a micro-encapsulated foaming agent uniformly dispersed therein is melt mixed. The foaming agent has a peak activation temperature which is higher than a temperature of the melt mixing. Next, the polymer composition is injection molded into a molded product. This carried out at the peak activation temperature to activate the foaming agent. Then, the molded product is crosslinked within the mold.

DETAILED DESCRIPTION OF THE EMBODIMENT(S)

Figure 1:
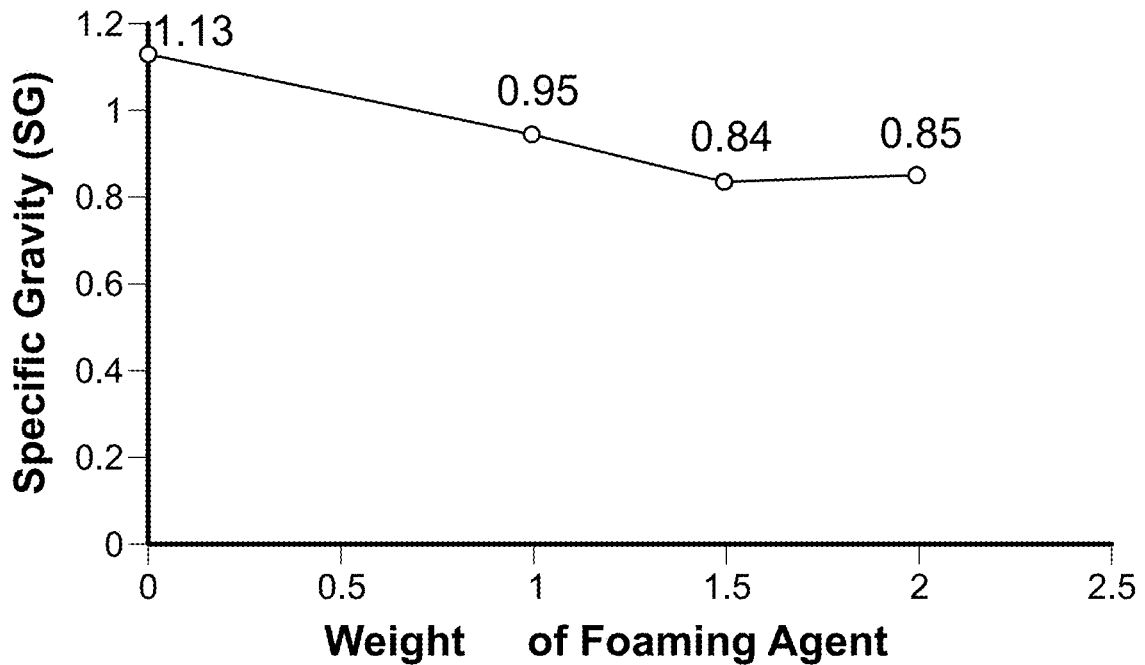
FIG. 1 is a graph showing a change in specific gravity of a foamable composition according to the invention with different addition levels of micro-encapsulated foaming agents.

The invention provides a method for producing a heat-shrinkable product which includes the following major steps of:
 (i) melt mixing a polymer composition; and
 (ii) injection molding the polymer composition.

In an embodiment of the invention, the polymer composition according to the invention includes a cross linkable polymer, a crosslinking agent and a micro-encapsulated foaming agent uniformly dispersed therein. Specifically, the foaming agent, such as a surfactant or a blowing agent, has a peak activation temperature higher than the melt mixing temperature.

After mixing, the polymer composition is injection molded under conditions of temperature and pressure such that expansion of the composition by the foaming agent and subsequent crosslinking of the molded product take place within the mold.

In addition to the foaming agent and crosslinking agent, the polymer composition may include optional fillers such as antioxidants, heat stabilizers, colorants, flame retardants and the like.

The base polymer material of the composition is preferably olefin-based and is chosen such that it will melt easily, withstand the heat and pressure of injection molding without degrading and mix homogeneously with the blowing agent.

Preferred polyolefins include polyethylenes which may be of any suitable density from very low to high density, medium density being preferred, metallocene polymerized ethylene; C4-C10 olefin-containing ethylene copolymers; copolymers and terpolymers of polyethylene with vinyl acetate, alkyl acetate, acrylic acid, maleic anhydride or carboxylic acid; polypropylene; ethylene propylene diene rubbers (EPDM); styrene butadiene rubbers, and rubber blends with polyolefins.

It is often desirable to mix a polymer having a relatively high level of crystallinity with a polymer having a relatively low level of crystallinity in order to achieve specific heat-recoverable properties. Preferred base polymers include medium density polyethylene and ethylene/vinyl acetate copolymer (EVA).

The base polymer is preferably present at 50% by weight to 90% by weight of the melt composition, and in another embodiment 60% by weight to 75% by weight of the melt composition.

In an exemplary embodiment of the invention the base polymer includes 30 to 70% by weight of polyethylene and 10 to 25% by weight of EVA, and in another embodiment 40 to 60% by weight of polyethylene and 10 to 20% by weight of EVA, based on the total composition.

The invention utilizes a blowing agent in the form of a plurality of polymeric shells encapsulating a heat-activated chemical compound. These capsules are often called microballoons. The chemical compound chosen is preferably a liquid at room temperature, and has a relatively low boiling point, i.e. less than 50° C. The specific chemical compound and polymeric shell materials are chosen such that the polymeric shells remain intact throughout the rigors of injection molding, more specifically, a polymer shell material is chosen such that the shell will not degrade or melt under the heat and pressure used in the mixing process, and will not rupture during the applied forces of the injection molding process. The shells should furthermore have high chemical resistance and be compatible with the polymer matrix.

The microballoons have an activation temperature at which the encapsulated liquid begins to boil and turn into a gas. At this activation temperature, the polymer shells are soft enough to begin to expand to allow for the increase in volume, as the chemical compound enters a gaseous phase, while still effectively encapsulating the chemical compound. This expansion of the microballoons forms the voids in the base polymer in order to create a foamed material. Generally, the activation temperature includes a temperature range in order to accommodate differences in microballoon size in a particular batch of the product. In addition, encapsulated blowing agents are often defined in terms of a minimum expansion temperature (or temperature range), i.e. the temperature at which the encapsulant begins to expand, and a maximum expansion temperature (or temperature range), i.e. the temperature at which the encapsulant has completed expansion. The activation temperature is generally somewhat lower than the maximum expansion temperature.

The polymeric shell can include, without limitation, polymers and copolymers of vinyl chloride, vinylidene chloride, acrylonitrile, methacrylonitrile, styrene, or combinations thereof. Preferably, the polymeric shell encapsulates a low-boiling hydrocarbon-based liquid such as isopentane or isobutane.

In an embodiment of the invention, the unexpanded polymer shells have a diameter ranging from 3 μm to 60 μm, and in another embodiment from 6 μm to 40 μm. The density of the unexpanded encapsulated blowing agent is generally less than 25 kg/m3. The unexpanded encapsulated blowing agent is used in an amount of between 0.5% and 3% by weight of the melt composition, and in another embodiment between about 1% and 2% of the melt composition, although the precise amount of blowing agent used is a function of the type of polymer, the type of blowing agent, and the presence of optional fillers.

In an embodiment, the encapsulated blowing agent is Expancel™ polymeric microballoons, available from Akzo Nobel. In general, such microballoons have an unexpanded diameter between 6 μm to 40 μm, and an expanded diameter between 20 μm to 150 μm. Preferred encapsulated heat-activated blowing agents include Expancel™091-DU-80 or Expancel™92-DU-120, or Expancel™950MB80 (in masterbatch form), which have polymeric shells comprising copolymers of acrylonitrile and methacrylonitrile, and all of which encapsulate isopentane.

In order to create a uniform, stable foam, however, the injection molding temperature and pressure are selected so that the blowing agent microballoons do not begin to expand until the polymer mixture is injected into the mold. Preferably, the blowing agent will be chosen such that its activation temperature is higher than that in the mixing temperature zone, but lower than that in the mold. It is therefore preferable to choose a blowing agent with a minimum expansion temperature above the melting temperature of the base polymer, so that expansion does not occur while the base polymer material is melting. And in another embodiment, the chosen blowing agent has a minimum expansion temperature higher than the desired mixing temperature of the melting step.

In one embodiment, the injection molding pressure is in a range from 10 to 20 MPa, and in another embodiment 12 to 17 MPa, and possibly about 15 MPa.

In order to produce a heat-recoverable molded product, the polymer material is crosslinked. Crosslinking gives the polymer a "memory" of its current shape, and gives the finished polymer molded part the ability to shrink or otherwise change shape upon heating. Crosslinking also increases the structural rigidity of the foamed polymer and assures that the foam will not decompress, or "go flat" when expanded or heat-shrunk. Crosslinking may be achieved by radiation or chemical means, and the polymer mixture may include crosslinking agents or promoters to increase the amount of crosslinking between discrete polymer chains. There are two general types of crosslinking promoters—chemical crosslinking promoters and radiation crosslinking promoters. Either or both of these types of crosslinking promoters may be used.

Preferred chemical crosslinking agents include peroxides, preferably organic peroxides such as 2,5-bis (t-butylperoxy)-2,5-dimethylhexane. A preferred content for a chemical crosslinking agent is 0.1 to 1.0% by weight based on the total composition.

A radiation crosslinking promoter acts as a catalyst to polymer crosslinking when exposed to radiation, such as from a high energy electron beam. The radiation crosslinking promoter may be chosen from among those conventionally used to promote crosslinking of polymers, including triallyl cyanurate (TAC), triallyl isocyanurate (TAIC), triallyl trimellitate, triallyl trimesate, tetrallyl pyromellitate, the diallyl ester of 1,1,3,-trimethyl-5-carboxy-3-(4-carboxyphenyl)indene, trimethylolpropane trimellitate (TMPTM), pentaerythritol trimethacrylate, tri(2-acryloxyethyl) isocyanurate, tri(2-methacryloxyethyl) trimellitate, and the like and combinations thereof. One preferred radiation crosslinking promoter is TMPTM commercially available as SartomerTMSR350 from Sartomer Company. Another is TAC. A preferred content for a radiation crosslinking promoter is 0.2 to 1.5% by weight, based on the total composition.

Flame retardants may also be added in an amount such as will provide effective flame retardancy for the foamed product. Suitable flame retardants typically include polybrominated aromatics, such as decabromobiphenyl, in combination with inorganic materials, such as antimony trioxide. Other possible flame retardants include alumina trihydrate and phosphorus-based retardants. Other fillers such as antioxidants, adhesion promoters, UV screeners, plasticizers, colorants, heat stabilizers and other additives may also be employed in conventional amounts. Such additives may be chosen based on the final end use of the product, as is known to those of skill in the art. The total content of flame retardants is preferably in a range of 15 to 30% by weight based on the total composition.

The quantity of optional fillers (which in this specification includes both crosslinking promoters and flame retardants, as well as the other fillers and additives referred to above) present in the melt composition is dependent on the type and quantity of base polymer and encapsulated blowing agent, as well as the desired physical properties. In general, the quantity of fillers is at most 35% by weight of the melt composition, and preferably at most 20% by weight of the melt composition. In another embodiment, the quantity of fillers is at most 10% by weight of the melt composition, e.g. 0 to 19.9% by weight of the melt composition.

The injection molding process for a foamable polymer according to the invention is similar to that known to those of skill in the art. The base polymer is first mixed with the blowing agent and other foamable polymer composition elements. Mixing is performed by any method known to those of skill in the art; preferably, mixing occurs by a Banbury type mixer. A twin-screw mixing device may also be successfully employed. Mixing occurs at an elevated temperature selected to be high enough that the base polymer will melt during mixing, but not high enough to activate the other components of the polymer mix, such as the blowing agent or any crosslinking promoter. Therefore, the mixing step takes place at a temperature higher than the melt temperature of the selected base polymer, but below the minimum activation temperatures of the blowing agent.

The mixed polymer blend in a melt state is then injected into a mold as is known in the art. The temperature of the polymer blend after melting and mixing but before injection can be independently set from the temperature at the time and point of injection. Preferably, the post-mixing, pre-injection temperature is set at a temperature equal to or higher than that of mixing but less than the minimum activation temperatures of the components in the polymer blend. The temperature of the mold is preferably set well above the minimum activation temperature of at least the blowing agent, i.e. at least 10° C. above. By waiting until just before injection to reach a temperature that activates the blowing agent it has been found that a more stable, uniform foam is created. At the time of activation, the liquid inside the polymer capsules of the blowing agent changes phase into a gaseous state, and the capsule expands to create a gas pocket. The melt composition is thereby formed into the desired shape, and foamed at approximately the same time.

The injection molding temperature is preferably in a range of 120 to 160° C., and in another embodiment 130 to 150° C. The mold temperature is preferably in a range of 170 to 210° C., and in another embodiment 180 to 200° C.

Once the molded body has undergone foaming, the blowing agent microballoons are in a fully expanded state, and the base polymer is in a melt, i.e. a highly viscous liquid-like state. As the body begins to cool just after molding, the polymer begins to solidify around the expanded microballoons. The microballoons are then frozen in an expanded state, creating the voids in the foam.

The molded body then undergoes post processing, generally including one step that involves exposure to heat. In a further step, the foamed polymer body is cross-linked. Depending on the type of crosslinking process used, the body is irradiated and/or heated to the proper temperature to activate the chemical crosslinking promoter. Irradiation occurs by any method known in the art, such as high energy electron beam irradiation. The purpose of crosslinking the polymer strands in the foam is to give the molded part a "memory" of the current shape of the product as well as structural stability above the melting point of the base resin.

Now, exemplary embodiments of the invention will now be described in detail, reference being made to the accompanying drawings wherein:

As set out in Table 1, three exemplary formulations for foamable compositions using an encapsulated blowing agent in accordance with the invention are described, together with a comparative example not using a blowing agent.

TABLE 1

| Ingredient Description | Ingredient | Weight % | | | |
|---|---|---|---|---|---|
| | | Reference 1 | Example 1 | Example 2 | Example 3 |
| Medium Density Polyethylene Base Resin | Clearflex-RL50 | 50.39 | 49.88 | 49.62 | 49.36 |
| EVA Base Resin | Elvax-3190 LGA | 15.22 | 15.07 | 14.99 | 14.92 |
| Foaming Agent | Expancel-950MB80 | 0 | 1.0 | 1.5 | 2.0 |
| Antioxidant | Agerite-Resin-D Pastilles | 2.03 | 2.01 | 2.0 | 1.99 |
| Carbon Black | Statex N115 (CB) | 3.04 | 3.01 | 3 | 2.98 |
| Processing Aid | Zinc Stearate | 1.52 | 1.51 | 1.5 | 1.49 |
| Flame Retardant | Saytex 8010 | 18.77 | 18.58 | 18.49 | 18.4 |
| Flame Retardant | Sica-Extra-Neige | 8.17 | 8.09 | 8.05 | 8.01 |
| Activator | Triallyl Cyanurate | 0.51 | 0.5 | 0.5 | 0.5 |
| Peroxide | Luperox | 0.35 | 0.35 | 0.35 | 0.35 |
| Crosslinking Agent | 101 | | | | |
| TOTAL | | 100 | 100 | 100 | 100 |

The four compositions in Table 1 were melt mixed at a temperature of 135° C. and injected into a mold at 15 MPa using an injection molding machine with six sections of which the first five were heated to 135±10° C. and the last to 145±10° C. The measured composition temperature rose from 134° C. in the first section to 145° C. in the last.

The mold was heated to 190±5° C., whereby expansion of the compositions of the invention took place in the mold.

The expanded compositions were then subjected to chemical or radiation crosslinking to give the final products. The physical properties of these are set out in Table 2.

TABLE 2

| Property | Reference 1 | Example 1 | Example 2 | Example 3 |
|---|---|---|---|---|
| Tensile strength at room temperature, MPa | 20.64 | 14.29 | 12.42 | 13.76 |
| Ultimate elongation % | 629 | 475 | 459 | 454 |
| Tensile strength after heat shock at 215° C. for 4 hours, MPa | 18.68 | 13.54 | 12.57 | 12.26 |
| Ultimate elongation (%) after heat shock at 215° C. for 4 hours | 584 | 417 | 457 | 391 |

TABLE 2-continued

| Property | Reference 1 | Example 1 | Example 2 | Example 3 |
|---|---|---|---|---|
| Tensile strength after heat shock at 160° C. for 168 hours, MPa | 18.25 | 14.3 | 13.42 | 13.13 |
| Ultimate elongation (%) after heat shock at 160° C. for 168 hours | 490 | 438 | 417 | 376 |
| Specific Gravity | 1.13 | 0.95 | 0.84 | 0.85 |
| Low temperature flexibility (−75° C.) | Pass | Pass | Pass | Pass |

Based on the above results, a preferred content of encapsulated blowing agent is the 1.5 weight percent of example 2, which gives the most favorable balance between specific gravity and physical properties, a key feature for heat-shrink products. This amount can, however, be varied according to the desired specific gravity of the foamed polymer. FIG. 1 shows that the specific gravity of the product can be reduced, approximately linearly from 1.13 with no foaming agent addition to 0.85 with an addition of 2 weight percent of foaming agent.

Figures 2, 3:
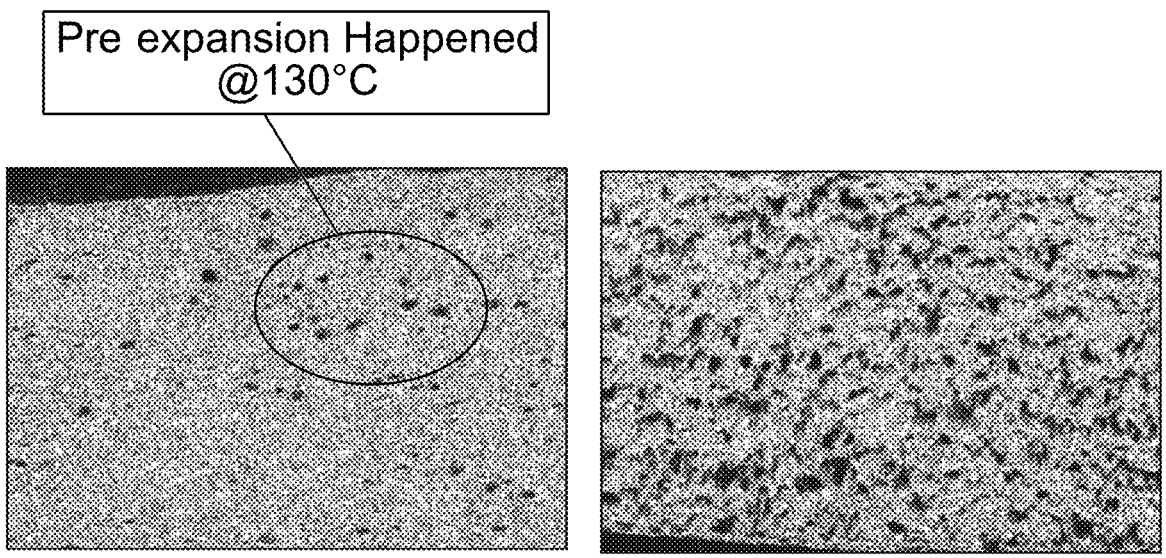
FIG. 2 is a micrograph of a foamable body according to the invention prior to expansion.
FIG. 3 is a micrograph showing the foamable body of FIG. 2 after expansion.

In FIG. 2, a micrograph shows a section of an expandable body of a polymer in accordance with the invention in which 1.5 weight percent of blowing agent micro-capsules are distributed. These show up as small dark spots.

FIG. 3 shows the expandable polymer body of FIG. 2 after expansion at 190° C.

The foregoing illustrates some of the possibilities for practicing the invention. Many other embodiments and fields of use for a shape memory product according to the invention are possible and within the scope and spirit of the invention. It is, therefore, intended that the foregoing description be regarded as illustrative rather than limiting, and that the scope of the invention is given by the appended claims together with their full range of equivalents.

What is claimed is:

1. A method for producing a shape memory product comprising the steps of:
melt mixing a polymer composition containing a polyethylene polymer, an organic peroxide crosslinking agent, and a micro-encapsulated foaming agent uniformly dispensed therein, the foaming agent having a peak activation temperature which is higher than a temperature of the melt mixing;
injection molding the polymer composition into a molded product, the injection molding carried out at the peak activation temperature to activate the micro-encapsulated foaming agent; and
crosslinking the molded product within a mold.

2. The method according to claim 1, wherein the polyethylene polymer is in an amount of 50-90 wt %, the micro encapsulated foaming agent is in an amount of 0.5 to 3 wt %; and the organic peroxide crosslinking agent is in an amount of 0.1 to 1 wt %.

3. The method according to claim 1, wherein the organic peroxide crosslinking agent is 2,5-bis (t-butylperoxy)-2,5-dimethylhexane.

4. The method according to claim 1, wherein the mold is heated to a temperature in a range of 170 to 210° C.

5. The method according to claim 1, wherein injection molding is carried out at a temperature in a range of 120 to 160° C.

6. The method according to claim 1, wherein the injection molding is carried out at a pressure in a range of 10 to 20 MPa.

7. The method according to claim 1, wherein the polymer composition further includes ethylene-vinyl acetate copolymer (EVA).

8. The method according to claim 7, wherein the polymer composition includes 40 to 60 wt % of polyethylene and 10 to 20 wt % of EVA.

9. The method according to claim 1, wherein the polymer composition includes a radiation crosslinking promoter.

10. The method according to claim 1, wherein the polymer composition further includes a flame retardant.

11. The method according to claim 10, wherein the flame retardant is selected from a group consisting of polybrominated aromatics, alumina trihydrate, and phosphorus-based retardants.

12. A method for producing a shape memory product comprising the steps of:
melt mixing a polymer composition containing a polyethylene polymer, a crosslinking agent, and a micro-encapsulated foaming agent uniformly dispensed therein, the foaming agent having a peak activation temperature which is higher than a temperature of the melt mixing;
injection molding the polymer composition into a molded product, the injection molding carried out at the peak activation temperature to activate the micro-encapsulated foaming agent; and
crosslinking the molded product within a mold having a mold temperature in a range from 170 to 210° C.

13. The method according to claim 12, wherein the crosslinking agent includes an organic peroxide compound.

14. The method according to claim 12, wherein the polymer composition includes the polyethylene polymer in an amount of 30 to 70 wt %.

15. The method according to claim 14, wherein the polymer composition further includes ethylene/vinyl acetate copolymer (EVA) in an amount 10 to 20 wt %.

16. The method according to claim 12, wherein the foaming agent includes a plurality of polymeric shells encapsulating a heat-activated chemical compound.

17. The method according to claim 16, wherein the plurality of polymeric shells have an unexpanded diameter between 6 μm to 40 μm, and an expanded diameter between 20 μm to 150 μm.

18. The method according to claim 12, wherein the crosslinking agent is in an amount of 0.2 to 1.5 wt %.

19. A method for producing a shape memory product comprising the steps of:
melt mixing a polymer composition containing a polyethylene polymer, a crosslinking agent, and a micro-encapsulated foaming agent uniformly dispensed therein, the foaming agent having a peak activation temperature which is higher than a temperature of the melt mixing;
injection molding the polymer composition into a molded product, the injection molding carried out at the peak activation temperature in a range of 120 to 160° C. to activate the micro-encapsulated foaming agent and at a pressure in a range of 10 to 20 MPa; and
crosslinking the molded product within a mold having a mold temperature in a range of 170 to 210° C.

20. The method according to claim 19, wherein the crosslinking agent includes an organic peroxide compound.

* * * * *